United States Patent
Waibel

(10) Patent No.: US 7,492,446 B2
(45) Date of Patent: Feb. 17, 2009

(54) ACTIVE BEAM CATCHER

(75) Inventor: Reinhard Waibel, Berneck (CH)

(73) Assignee: Hilti Aktiengesellschaft, Schaan (LI)

( * ) Notice: Subject to any disclaimer, the term of this patent is extended or adjusted under 35 U.S.C. 154(b) by 256 days.

(21) Appl. No.: 11/297,102

(22) Filed: Dec. 7, 2005

(65) Prior Publication Data

US 2006/0126078 A1    Jun. 15, 2006

(30) Foreign Application Priority Data

Dec. 10, 2004    (DE)    ........................ 10 2004 059 639

(51) Int. Cl.
*G01J 1/00*    (2006.01)
(52) U.S. Cl. .................... 356/121; 250/214 R
(58) Field of Classification Search ............... 356/4.08, 356/141.3, 141.4, 615, 616, 622, 399, 400; 33/293, 294
See application file for complete search history.

(56) References Cited

U.S. PATENT DOCUMENTS 3,894,230 A    7/1975    Rorden et al.
4,039,825 A *  8/1977   Doyle .......................... 356/622
4,674,855 A *  6/1987   Utagawa ...................... 306/106
4,693,598 A *  9/1987   Sehr ........................... 356/4.08
4,948,249 A *  8/1990   Hopkins et al. ............. 356/121
5,066,130 A * 11/1991   Tsukiji et al. ............... 356/494
7,030,361 B2 * 4/2006   Douglas ...................... 356/4.08

FOREIGN PATENT DOCUMENTS

EP    0426287 A1    5/1991

* cited by examiner

Primary Examiner—Gregory J Toatley, Jr.
Assistant Examiner—Juan D Valentin
(74) Attorney, Agent, or Firm—Abelman, Frayne & Schwab

(57) ABSTRACT

A beam catcher (3) for a light beam (1) includes a photodetector (6) having a plurality of photodiodes (8) which are offset along a line in a defined manner with respect to a reference point (7), an evaluating unit (11) having a parameter set (P) of at least one associated line laser transmitter (2) for emitting the light beam, a quantity determining module (13) for determining an energy quantity associated with the detected light energy E of the light beam (1), and an error estimating module (14) for estimating an error estimate value (F) depending upon the energy quantity, and an offset display (9) for displaying the offset of the light bean (1) with respect to the reference point (7).

9 Claims, 1 Drawing Sheet

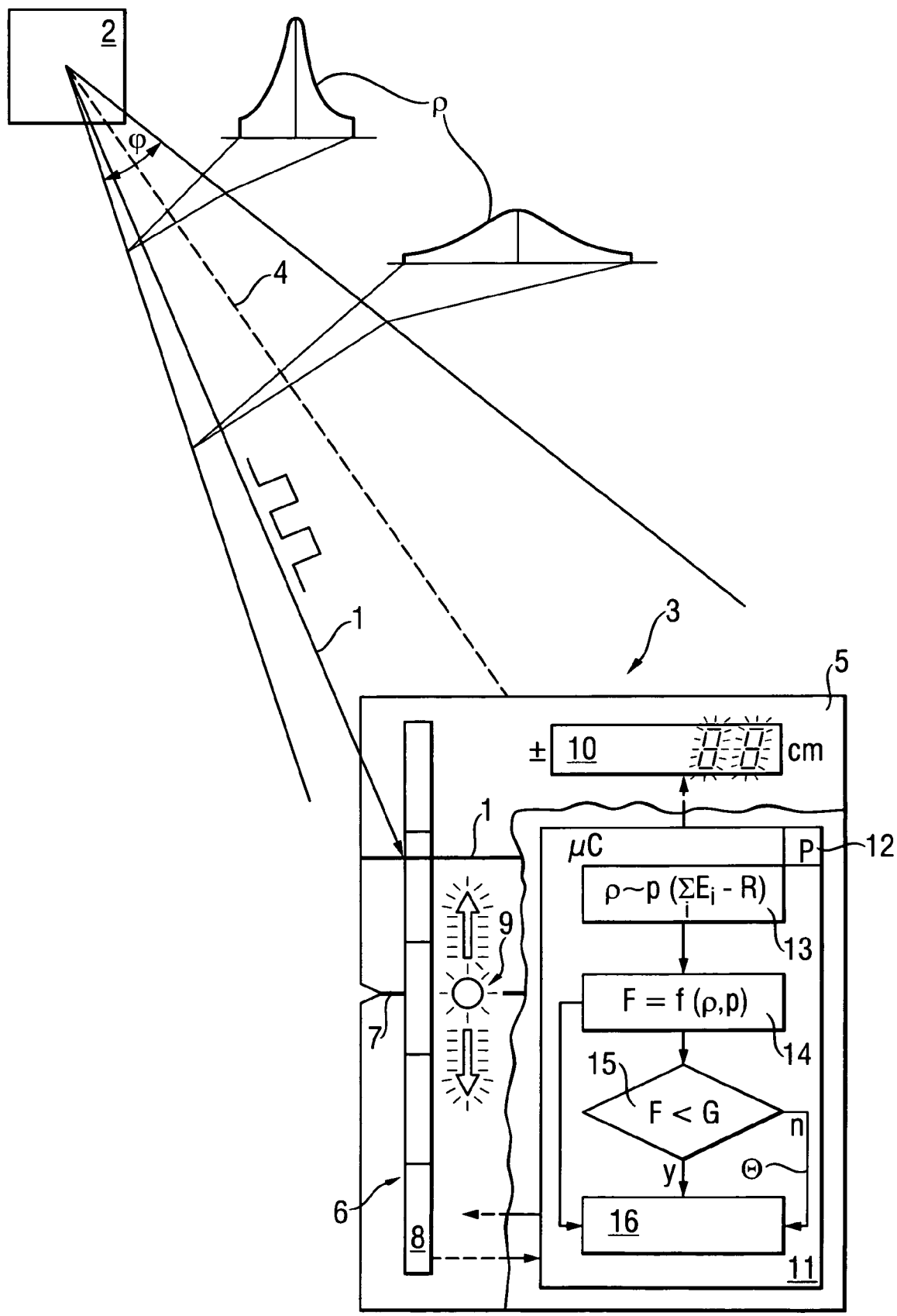

ACTIVE BEAM CATCHER

BACKGROUND OF THE INVENTION

1. Field of the Invention

The invention is directed to an active beam catcher, in particular for a fanned laser beam of a line laser transmitter.

2. Description of the Prior Art

Positioning devices which emit laser beams for marking are widely used for positioning tasks in the building industry. Particularly, at large distances and with poorly reflecting substrates and strict requirements for absolute positioning accuracy, beam catchers that are associated with the positioning devices, are used for reliably finding the beam, for exact marking and for definitive determination of a positional deviation. In line laser transmitters, a line, instead of a punctiform light spot, is projected on the wall by a laser beam that is fanned out in an angular sector. In the least favorable case, the tilt error in the projection direction, the tilt offset perpendicular to the projection direction and the straightness error of the fanned out laser beam add up to a total error in positioning accuracy which, moreover, increases linearly with an increasing distance from the positioning device. This is particularly significant because positioning with modern positioning devices and beam catchers is reliable over large distances of greater than 100 m even in unfavorable, e.g., bright, surroundings. In favorable, e.g., dark, surroundings, however, it would still be possible to detect the laser beam over a multiple of the distance, although the total error would be too large. It is of great practical importance for the user to prevent positioning of this kind with an excessive total error.

In conventional passive beam catchers, optical devices such as splitters or Fresnel lenses are used to convert minimal positional differences in the impinging laser light beam into qualitatively different displays. In conventional active beam catchers, a photodetector that is supplied by a power source, serves to receive the laser light beam, and a display connected to an evaluating unit is used to determine the offset of the light beam relative to the reference point.

According to U.S. Pat. No. 3,894,230, an active beam catcher for a pulsating light beam has a photodetector with a plurality of photodiodes which are offset along a line in a defined manner with respect to a reference point in the form of a pulse-controlled photodiode array, an evaluating unit, and a numerical read-out display of the offset of the light beam with respect to the reference point.

According to European Publication EP0426287, an active beam catcher for a light beam has pairs of photodetectors so that the determined, displayed center position of the light beam can be determined independent from its light spot size, and the energy distribution in the beam cross-section. No decision is made with respect to a possible total error.

It is the object of the present invention to realize an active beam catcher with which possible positioning with an excessive total error is prevented when the beam catcher is used with an associated line laser transmitter.

SUMMARY OF THE INVENTION

This and other objects of the present invention, which will become apparent hereinafter, are achieved by providing an active beam catcher for a light beam and having a photodetector with a plurality of photodiodes which are offset in a defined manner with respect to a reference point along a line in the form of a photodiode array, an evaluating unit, and an offset display for displaying the offset of the light beam with respect to the reference point. The evaluating unit has a parameter set of at least one associated line laser transmitter, a quantity determining module for determining an energy quantity associated with the detected light energy of the light beam, and an error estimating module for estimating an error estimation value that depends upon the energy quantity.

The error estimating module, which depends upon the detected light energy, provides an error estimation value which stops the user from positioning with an excessive total error.

The following explanation will contribute to a clearer understanding. For physical reasons, the intensity distribution in the elliptic beam cross-section of a laser diode is usually Gaussian along each of the semiaxes. Accordingly, a laser beam which is split by a beam splitter so as to fan out linearly, usually along the major semiaxis in a line laser transmitter, is also correspondingly distributed with respect to the line energy density which decreases toward the split line ends. In addition, the line energy density decreases linearly with the distance in the sector swept by the laser beam which is split in a fanned out manner. Therefore, this line energy density falls below a given threshold in the center of the sector at greater distances and at the edge of the sector at shorter distances. This dependency is inversely correlated sufficiently well with the total error whose substantial components include the tilt error in the projection direction, which is proportional to the distance, and the tilt offset perpendicular to the projection direction which is proportional to the angular offset from the center of the sector. Accordingly, the inverse detected line energy density is approximately proportional to the possible total error when positioning and, therefore, presents a suitable criterion that can be evaluated for preventing use with a possibly excessive total error. By using the parameters specific to the corresponding line laser transmitter, the line energy density and, further, an absolute error estimation value can be determined from the light energy detected by the photodiode array.

When determining the line energy density, the detected light energy is advantageously reduced by the background noise energy so that protection against interference is improved particularly with pulsed line lasers.

The parameter set is advantageously stored in a programmable storage area so that it is possible to program the parameter set in particular cases, e.g., for final adjustment.

The evaluating unit is advantageously connected to an error display for digitally displaying the error estimation value so that the user is informed about the confidence range for positioning.

The error estimation value is advantageously compared with a threshold error value by the evaluating unit so that a logical error signal is provided.

Signal means for generating an error signal is advantageously associated with the evaluating unit, so that the user can be informed about impermissible positioning.

A control module is advantageously assigned for actively stopping positioning operations depending upon the error signal, so that it is not possible to perform positioning with a possibly excessive total error when using the parameters correspondingly associated with the used line laser transmitter.

In order to stop positioning operations, the display is modified in an abnormal manner, e.g., by activating all display means or by alternating display patterns so that positioning with the beam catcher is likewise no longer possible. The user is informed about the active halting of positioning operations based on the possibility of an excessive measurement error by a modified, but obviously functional, display.

The display is advantageously deactivated for stopping positioning operations so that positioning by active means of the beam catcher is definitely no longer possible.

The novel features of the present invention, which are considered as characteristic for the invention, are set forth in the appended claims. The invention itself, however, both as to its construction and its mode of operation, together with additional advantages and objects thereof, will be best understood from the following detailed description of a preferred embodiment, when read with reference to the accompanying drawings.

BRIEF DESCRIPTION OF THE DRAWINGS:

In the drawings:

Single FIGURE shows schematically an active beam catcher according to the present invention

DETAILED DESCRIPTION OF THE PREFERRED EMBODIMENT

As is shown in the drawing, a hand-held active beam catcher 3 is so arranged in an angular sector φ of a pulsed laser beam 1 of a line laser transmitter 2, which is split in a fanned out manner, that the laser beam 1 travels transversely along the active beam catcher 3. The line energy density ρ decreases in the illuminated angular sector φ with increasing distance X from the line laser transmitter 2 and is distributed in a Gaussian shape with respect to the sector center 4. Inside a housing 5 that can be held in the hand, the active beam catcher 3 has a photodetector 6 with five photodiodes 8 which are offset along a line in a defined manner with respect to the reference point 7 in the form of a photodiode array, an offset display 9, a digital error display 10, and an evaluating unit 11 which is electronically connected with the photodiodes 8, the offset display 9, and the error display 10. The evaluating unit 11 itself, which is constructed with a controlling algorithm as microcontroller μC, has, in a programmable storage area 12, a parameter set P which characterizes the line laser transmitter 2, a quantity determining module 13, an error estimating module 14, a decision module 15, and a control module 16. In the quantity determining module 13, the detected light energy $E_i$ of all (i=1 ... 5) photodiodes 8 is reduced by the background noise energy R to determine the line energy density ρ. An error estimation value F is determined in the error estimating module 14, depending upon the line energy density ρ and the parameter set P, with the estimating function f. In the decision module 15, the error estimation value F is compared to a threshold error value G, and a logical error signal Θ is provided when the latter is exceeded. In the state shown in the drawing with a possibly excessive total error and an activated error signal Θ, all of the luminous segments of the offset display 9 and error display 10 are controlled by the control module 16 so as to blink in an abnormal manner so that no offset position can be read off by the user and positioning operations are, therefore, prevented. In addition, the user is informed about the possibility of an excessive total error by the blinking luminous segments of the offset display 9, which act as signaling means, and by the error display 10. In the state of use that is not shown in the drawing, when the error signal Θ is deactivated, the offset of the laser beam 1 with respect to the reference mark 7 is displayed qualitatively so as to be controlled by the control module 16 by exactly one illuminated luminous segment, and the associated error estimation value F, determined in the error estimating module 14, is displayed digitally in the error display 10.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A beam catcher for a light beam (1), comprising:
a photodetector (6) having a plurality of photodiodes (8) which are offset along a line in a defined manner with respect to a reference point (7);
an evaluating unit (11) having a parameter set (P) of at least one associated line laser transmitter (2) for emitting the light beam (1);
a quantity determining module (13) for determining an energy quantity associated with a detected light energy (L) of the light beam (1);
an error estimating module (14) for determining an error estimation value (F) from a line energy density (ρ) and the parameter set (P), using an estimating function (f);
a decision module (15) for comparing the error estimation value (F) to a threshold error value (G), and for generating and outputting an error signal (Θ) to a user when the error estimation value (F) exceeds the threshold error value (G), to stop the user from positioning the beam catcher with an excess total error in position; and
an offset display (9) for displaying offset of the light beam (1) with respect to the reference point (7).

2. A beam catcher according to claim 1, wherein the detected light energy (E) is reduced by a background noise energy (R) by the quantity determining module (13).

3. A beam catcher according to claim 1, wherein the evaluating unit (11) has a programmable storage area (12) for storing the parameter set (P).

4. A beam catcher according to claim 1, wherein the evaluating unit (11) is connected to an error display (10) for digitally displaying the error estimation value.

5. A beam catcher according to claim 1, wherein the evaluating unit (11) includes the decision module to compare the error estimation value (F) with the threshold error value (G), for generating the error signal (Θ).

6. A beam catcher according to claim 5, comprising a control module (16) associated with the evaluating unit (11) for signaling the error signal (Θ) depending on the error signal (Θ).

7. A beam catcher according to claim 6, wherein the control module (16) is associated with the evaluating unit (11) for actively stopping positioning operations depending upon the error signal (Θ).

8. A beam catcher according to claim 7, wherein the control module (16) modifies display of the offset position in an abnormal manner.

9. A beam catcher according to claim 8, wherein the control module (16) deactivates the display of the offset position.

* * * * *